United States Patent

Nakase et al.

[11] Patent Number: 5,558,456
[45] Date of Patent: Sep. 24, 1996

[54] DRIVE BEARING ARRANGEMENTS FOR WATERCRAFT

[75] Inventors: Ryoichi Nakase; Noboru Suganuma, both of Hamamatsu, Japan

[73] Assignee: Sanshin Kogyo Kabushiki Kaisha, Hamamatsu, Japan

[21] Appl. No.: 325,702

[22] Filed: Oct. 19, 1994

[30] Foreign Application Priority Data

Oct. 19, 1993 [JP] Japan .................................. 5-261187

[51] Int. Cl.⁶ ............................ B63H 23/00; F16D 1/06
[52] U.S. Cl. ........................ 403/359; 403/365; 440/83
[58] Field of Search ........................... 384/484; 403/26, 403/359, 365; 440/52, 83

[56] References Cited

U.S. PATENT DOCUMENTS

| | | | |
|---|---|---|---|
| 1,267,117 | 5/1918 | Riotte | 440/83 |
| 2,866,670 | 12/1958 | Harris et al. | 384/484 |
| 3,014,768 | 12/1961 | Dickinson | 384/484 |
| 3,970,398 | 7/1976 | Wilson | 403/26 |
| 4,722,707 | 2/1988 | Murase | 440/83 X |

FOREIGN PATENT DOCUMENTS 648386   2/1994   Japan ................................ 440/83

Primary Examiner—Kenneth J. Dorner
Assistant Examiner—Andrea Chop
Attorney, Agent, or Firm—Knobbe, Martens, Olson & Bear

[57] ABSTRACT

A corrosion-resistant high-strength drive connection between a coupling element and a shaft that is supported in an anti-friction bearing. The shaft has a direct splined connection with the coupling element and is encircled by a corrosion-resistant sleeve that has an inter-fitting relationship with the coupling element to protect the spline from corrosion.

10 Claims, 5 Drawing Sheets

5,558,456

DRIVE BEARING ARRANGEMENTS FOR WATERCRAFT

BACKGROUND OF THE INVENTION

This invention relates to a drive bearing arrangement for a watercraft, and more particularly to an improved arrangement for journaling a shaft and providing a driving coupling between it and a coupling element.

In many forms of watercraft, a shaft is provided which is journaled within the inner race of a bearing and which is coupled to another shaft by means of a flexible coupling. For example, in many types of watercraft, the propeller shaft, which is connected to a propulsion device such as a propeller in a propeller driven watercraft or the impeller of a jet pump in a jet propelled watercraft is journalled at its forward end within an anti-friction bearing. The forward end of this propeller shaft is coupled by means of a coupling to the engine output shaft.

Normally the propeller shaft is drivingly connected to a coupling element by means of a tubular sleeve that has a splined connection at one end to the propeller shaft and a splined connection at the other end to the coupling element. This tubular sleeve is press-fit within the inner race of a supporting bearing. Normally the sleeve is formed from a corrosion-resistant material such as stainless steel or the like.

Because of this type of connection, the actual splines that transmit the power are relatively small and this can give rise to low capability of power transmission and/or the likelihood of premature wear. The problems can be alleviated by providing a larger diameter for the tubular member, but because of the spacial requirements this is not always possible. In addition, the tubular member could be formed from a higher strength material, but the its corrosion-resistant properties would be lost and the seals which are engaged with the tubular member on the opposite sides of the anti-friction bearing would be subject to premature wear.

The problems with the prior art-type of construction can be understood by reference to FIG. 1, which is a side elevational view with portions broken away, showing the connection of the front end of a propeller shaft to a coupling element of a flexible coupling which is driven by an engine. The propeller shaft, indicated by the reference number 11, is journaled within a bearing assembly 12 that is affixed to the front of a bulkhead through which the propeller shaft 11 passes. The bearing assembly 12 includes a plurality of anti-friction balls 13 that are received within an inner race 14.

A tubular sleeve 15, formed from a corrosion-resistant material such as stainless steel, is press-fit into the inner race 14 and has internal splines 16 which are engaged with external splines 17 formed at the forward end of the propeller shaft 11.

The forward end of the tubular member 15 is provided with external splines 18 that are received in internal splines of a hub 19 of a coupling element, indicated generally by the reference number 21 and shown in phantom in this figure. The coupling element 21 forms one part of a conventional vibration damping coupling which is coupled in a known matter to the engine output shaft for driving the propeller shaft 11.

A pair of seals 22 are disposed on opposite sides of the bearing elements 13 and are engaged with the outer periphery of the tubular member 15.

It should be readily apparent that the splines 18 are relatively small and hence the power transmitting capabilities of the arrangement are reduced, and the likelihood of wear increased. As previously noted, it is not always feasible to increase the diameter of the sleeve 15 so as to provide a higher strength assembly. In addition, if stronger materials are used to form the sleeve 15, then the corrosion-resistant properties will be lost and the seals 22 could be damaged when the sleeve 15 becomes corroded.

It is, therefore, a principal object of this invention to provide an improved coupling arrangement for connecting a shaft to a coupling element.

It is a further object of this invention to provide an improved, high-strength and corrosion-resistant coupling between a coupling element and a shaft of a marine propulsion unit.

SUMMARY OF THE INVENTION

This invention is adapted to be embodied in a coupling between a shaft and a drive coupling element. The shaft passes with a clearance through the inner race of an anti-friction bearing. The shaft has a spline portion that extends beyond the inner race and the coupling has an inner hub that is formed with a splined opening for receiving and forming a driving connection with the shaft spline portion. A corrosion-resistant tubular member extends in the area between the inner race and the shaft and in interfitting relationship with the inner hub for providing corrosion protection while not transmitting any driving power.

DETAILED DESCRIPTION OF THE PREFERRED EMBODIMENT

Figure 1:
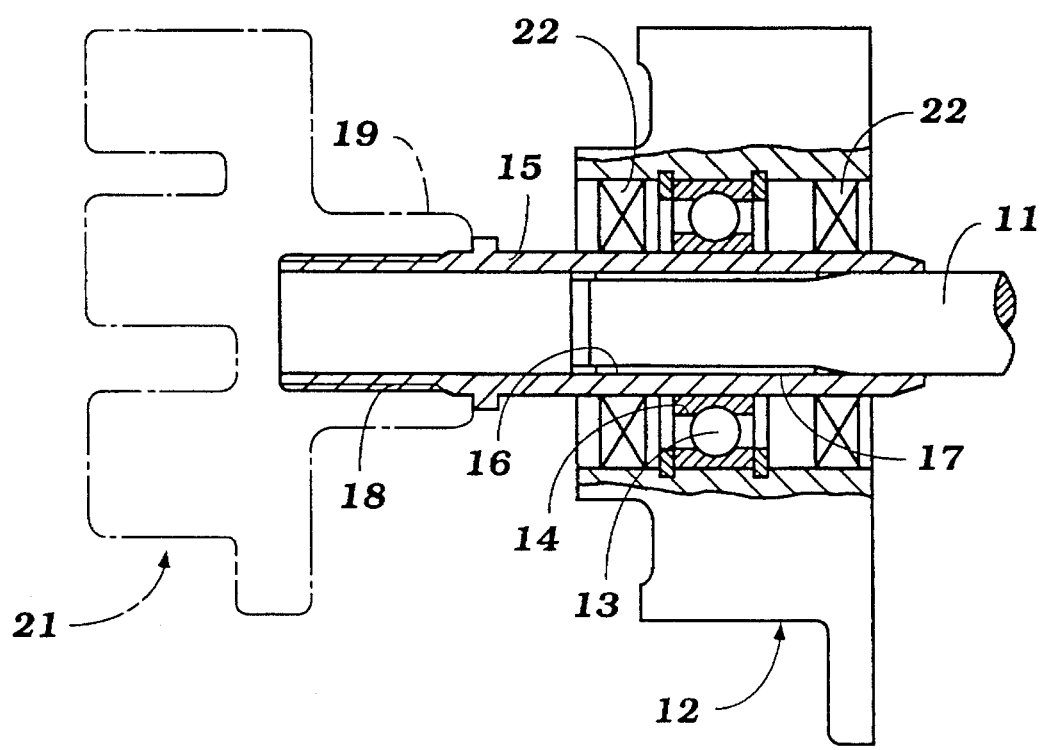
FIG. 1 is a side elevational view, with a portion broken away and shown in section and another portion shown in phantom, of a connection between a coupling element and a propeller shaft and bearing support for the latter in a conventional prior art-type of marine propulsion unit.
Figure 2:
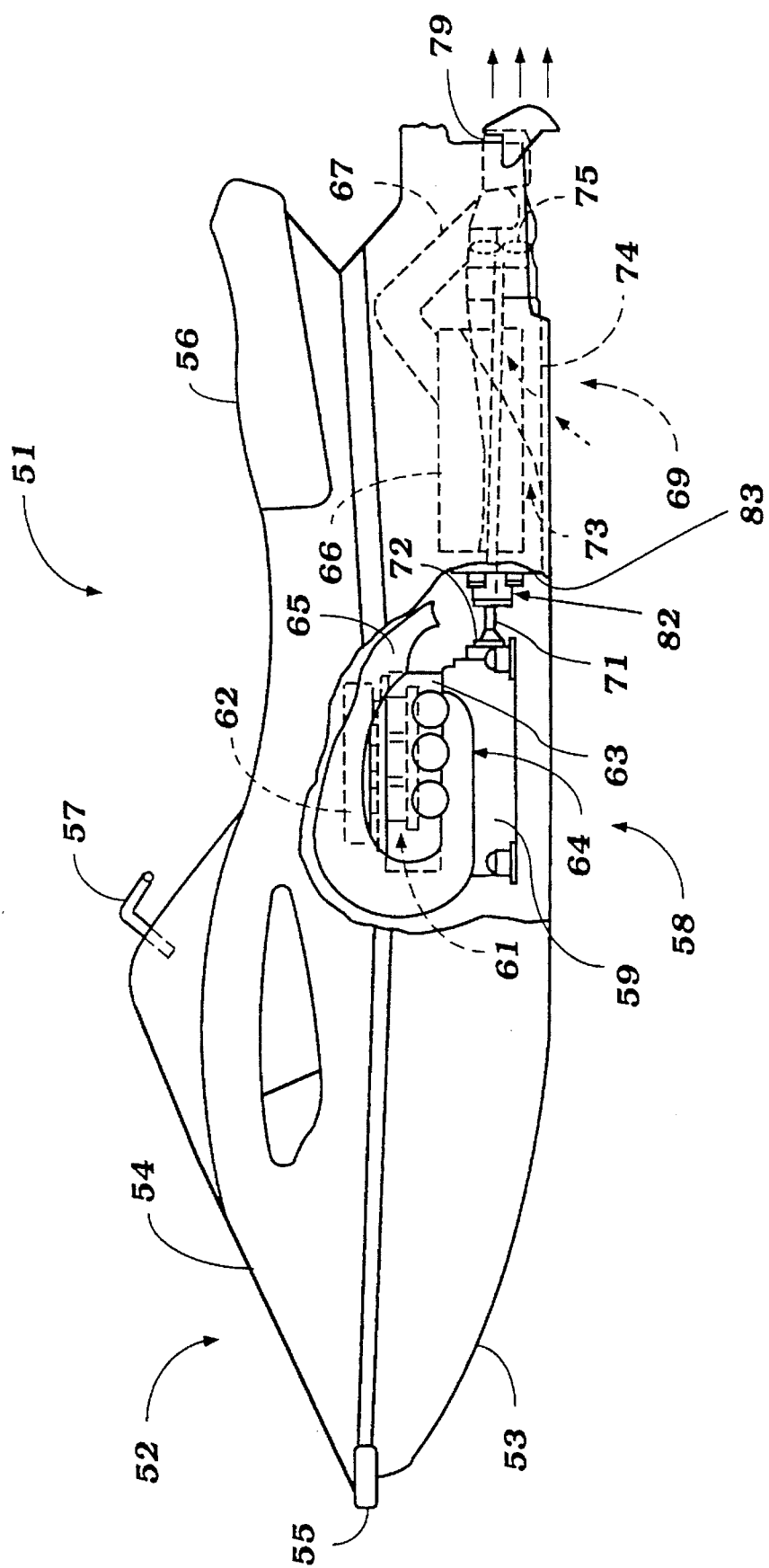
FIG. 2 is a side elevational view, with a portion broken away, of a watercraft embodying a coupling arrangement constructed in accordance with an embodiment of the invention.
Figure 3:
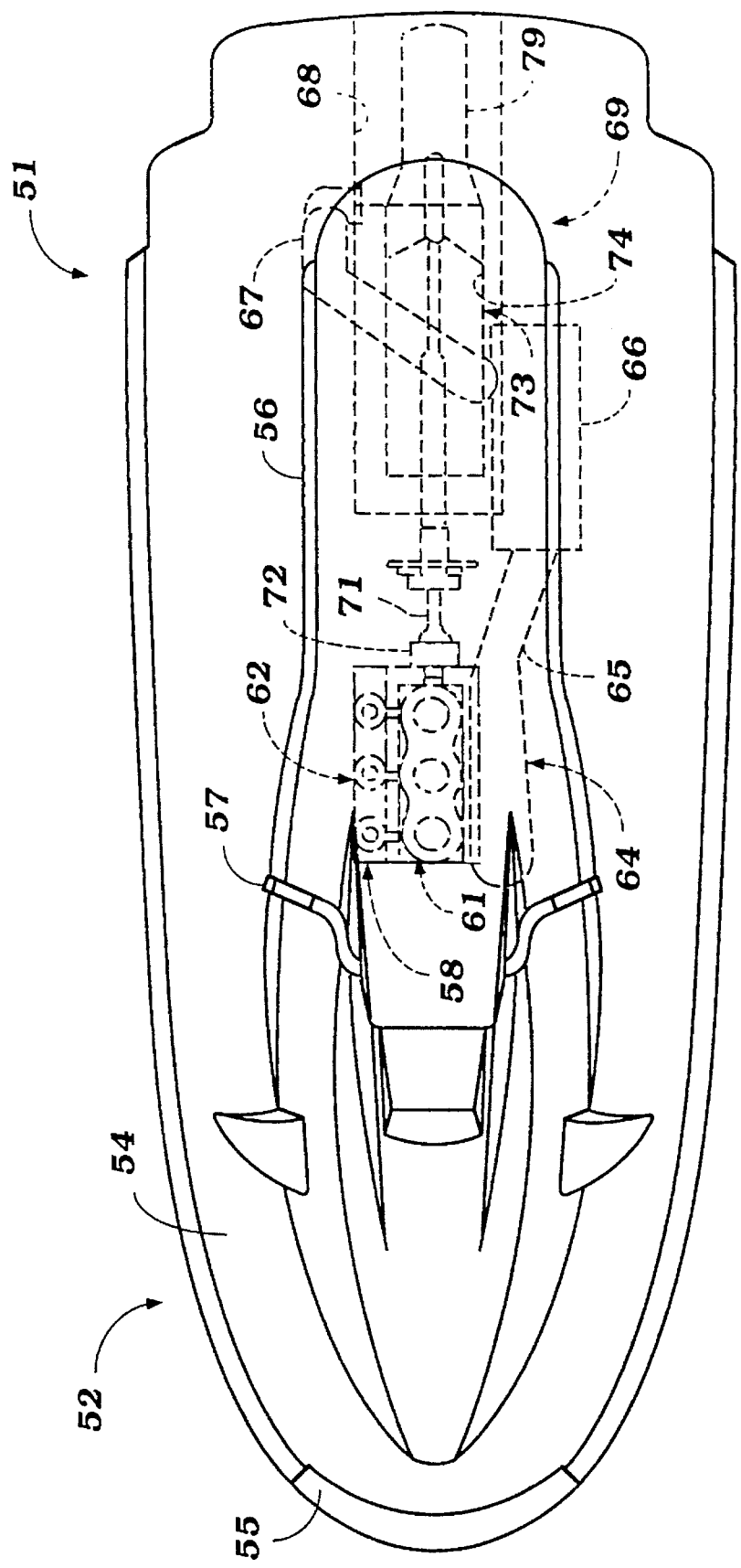
FIG. 3 is a top plan view of the watercraft.

Referring now in detail to the drawings and initially to FIGS. 2 and 3, a small watercraft embodying the invention is identified generally by the reference number 51. The particular type of small watercraft illustrated is just typical of those types of applications where the invention may be employed. It should be readily obvious to those skilled in the art that the invention may be employed in a wide variety of types of watercraft, and in fact some features of the invention may be employed with applications other then the watercraft. However, the invention does have particular utility with the type of small watercraft depicted and identified by the reference number 51 due to the sporting nature of this type of watercraft. That is, the watercraft 51 is of a type that may become capsized in operation and where water might collect on elements of the drive and cause corrosion which could be detrimental.

The watercraft 51 is comprised of a hull assembly 52 that consists of a lower hull portion 53 and an upper deck portion 54. The hull portion 53 and deck portion 54 may be formed from any light-weight high-strength material such as a molded fiberglass reinforced resinous plastic or the like. The portions 53 and 54 are affixed to each other in any suitable manner and a bumper 55 may be provided at their forward ends.

The watercraft 51 and specifically the deck portion 54 is provided with a raised seat 56 at the rear thereof that is adapted to accommodate one or more riders seated in straddle fashion, one behind the other. A handlebar control 57 is provided at the forward part of the seat 56 for steering of the watercraft 51 in a manner which will be described.

The area beneath the handlebar assembly 57 and below the seat 56 is formed with an engine compartment in which an internal combustion engine, indicated generally by the reference number 58, is provided.

The engine 58 is, in the illustrated embodiment, of the three-cylinder, in-line, two-cycle, crankcase compression type. It will be readily apparent, however, to those skilled in the art that the invention may be utilized with a wide variety of types of engines.

The engine 58 is provided with a cylinder block 59 that is mounted in the hull portion 53 in a known manner and which has a cylinder head 61 affixed thereto. An induction system comprised of a plurality of carburetors 62 is provided on one side of the cylinder block 59 and delivers a charge to the crankcase chambers of the engine 58 in a well-known manner. The burnt charge is exhausted through an exhaust manifold 63, disposed on the opposite side of the engine, and from that into a combined transfer tube and expansion chamber device, indicated generally by the reference number 64 which curves upwardly and passes across the upper end of the engine 58. This expansion device 64 communicates with an exhaust pipe 65, which conveys the exhaust gasses to a water trap device 66. The water trap device 66 permits the exhaust gasses to flow to the atmosphere through a discharge pipe 67, which discharges into a tunnel 68 formed at the rear underside of the hull portion 53. The water trap device 66 will act, however, to insure that water cannot enter the engine through the exhaust system as thus far described.

Figure 4:
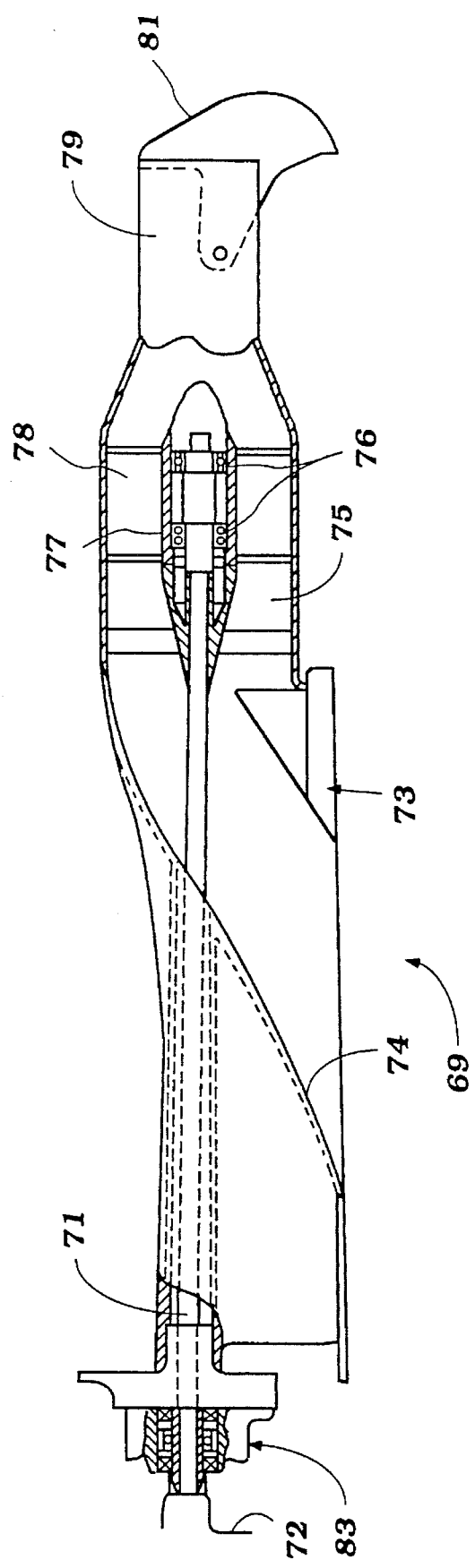
FIG. 4 is an enlarged side elevational view of the jet propulsion unit of the watercraft, with portions broken away and shown in section.

A jet propulsion unit, indicated generally by the reference number 69 and shown in most detail in FIG. 4, is provided in the tunnel 68. The jet propulsion unit 69 has an impeller shaft 71 which is driven from an output shaft of the engine 59 by a coupling 72. This driving arrangement will be described later in more detail by reference to FIGS. 4 and 5.

The jet propulsion unit 69 has a water inlet portion, indicated generally by the reference number 73, which has a downwardly-facing water inlet opening 74 through which water is drawn from the body of water in which the watercraft is operating. An impeller 75 is affixed to the rear end of the impeller shaft 71 and is driven to draw this water into the water inlet opening 74.

The rear end of the impeller shaft 71 is journaled by means of bearings 76 in a nacel 77 formed centrally of a plurality of straightening vanes 78 past which the water pumped by the impeller 75 is discharged. This water then exits through a steering nozzle 79 to provide a propulsion force for the watercraft. The steering nozzle 79 is pivotally supported on the outer housing of the jet propulsion unit about a vertically-extending axis and is steered by the handlebar assembly 57 in a known manner for controlling the direction of travel of the watercraft 52.

A reverse thrust bucket 81 is supported on the end of the steering nozzle 79 and is operated by a suitable control for effecting rearward or reverse propulsion of the watercraft 51 when desired and in a well-known manner.

Figure 5:
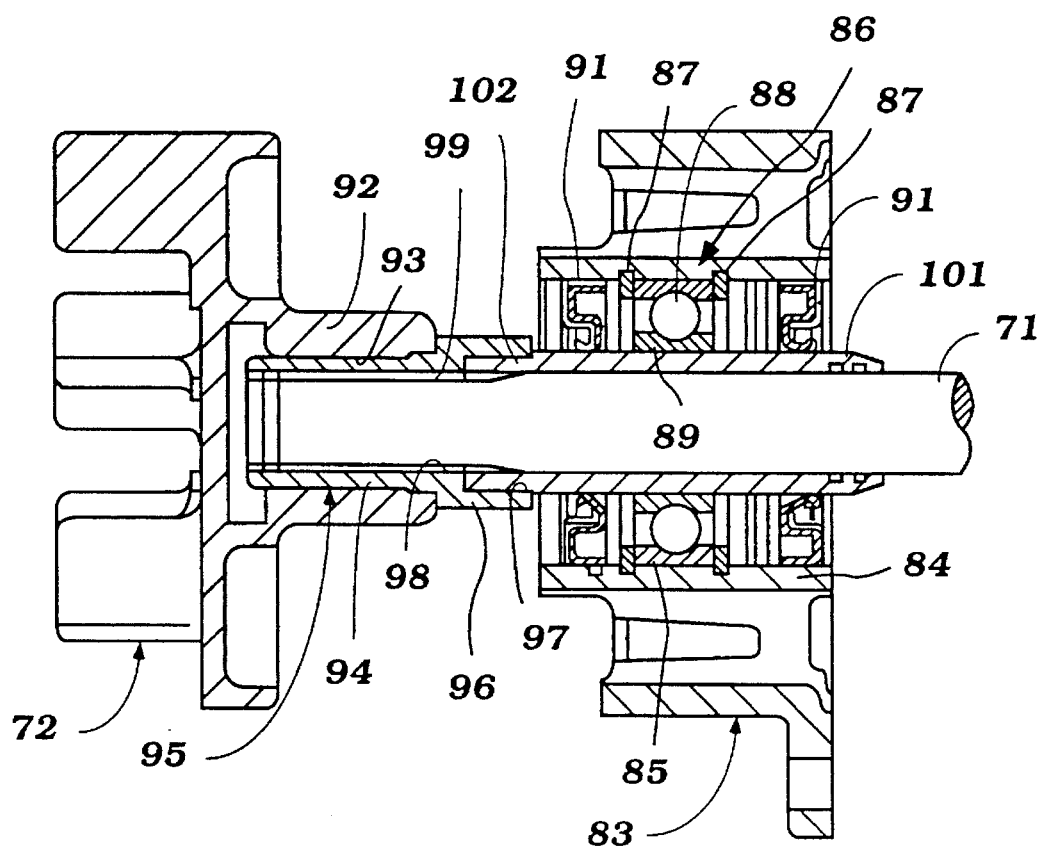
FIG. 5 is an enlarged cross-sectional view showing the arrangement for driving the impeller shaft of the jet propulsion unit and shows the portion appearing at the left-hand side of FIG. 4.

The construction for coupling the impeller shaft 71 to the engine output shaft, and specifically the coupling element 72 which provides an elastic coupling to the engine output shaft, will now be described by particular reference to FIGS. 4 and 5.

The forward end of the impeller shaft 71 extends through a bulkhead 82 (FIG. 2) formed in the hull portion 53 at the forward end of the tunnel 68. A bearing assembly, indicated generally by the reference number 83, is supported on this bulkhead. The bearing assembly 83 is comprised of an outer housing 84 into which an outer race 85 of an anti-friction bearing assembly, indicated generally by the reference number 86, is press fit and retained by a pair of snap or retainer rings 87. Ball elements 88 are supported between the outer race 85 and an inner race 89, which inner race has a diameter that is larger than the diameter of the impeller shaft 71. Said another way, the impeller shaft 71 extends with a clearance through the inner race 69 and forwardly thereof.

A pair of lip-type seals 91 are received in the outer housing 84 on opposite sides of the bearing assembly 86 so as to provide a seal for it.

The coupling element 72 is provided with a hub portion 92 that has an inner diameter 93 that receives a first portion 94 of a torque transmitting sleeve or inner hub 95. The inner hub 95 is formed from a high-strength material such as a chromium molybdenum steel and the portion 94 is affixed within the hub opening 92, as by welding or brazing. Rearwardly of the hub 92, the torque transmitting inner hub 95 is provided with an enlarged diameter portion 96 that has a bore 97 for a purpose which will be described.

The inner hub 95 is provided with an elongated female spline 98 that is engaged by a male spline 99 of the impeller shaft 71 so as to provide a direct driving relationship between the coupling element 72 and the impeller shaft 71. As a result, there is a very massive spline arrangement for achieving the drive and, therefore, large powers can be transmitted and the likelihood of wear is reduced.

In order to provide corrosion protection, a stainless steel sleeve 101 is press fit into the inner race 89 of the bearing 86 and is slidably supported on the outer end of the impeller shaft 71 and thus journals the impeller shaft 71 within the bearing assembly 86.

The forward portion of the corrosion-resistant sleeve 101 has a reduced diameter portion 102 that is complimentary to and received within the inner hub bore 97 so as to provide an interfitting relationship that will preclude the likelihood of water entering into the splines 98 and 99.

It should be readily apparent that the device can be easily disassembled by slipping the hub elements 92 and 95 off of the splined impeller shaft 71 and then the corrosion-resistant sleeve 101 may also be removed.

From the foregoing description it should be readily apparent that the driving connection is not only very robust and wear-resistant, but it is also corrosion-resistant and thus solves the problems with the prior art-type of construction.

Although the invention is described in conjunction with the connection between the impeller shaft and the engine coupling, it should be understood that a similar arrangement could be employed between the engine output shaft and the element of the coupling which is attached to it. Various other changes and modifications may be made without departing from the spirit and scope of the invention, as defined by the appended claims.

We claim:

1. A coupling between a shaft extending through a supporting wall and a drive coupling element disposed on only one side of said supporting wall, said shaft passing with a clearance through the inner race of an anti-friction bearing the outer housing of which is fixed to said supporting wall, said shaft having a splined portion extending on said one side of said supporting wall beyond said inner race, said coupling element having an inner hub formed with a splined opening receiving and forming a driving connection to said shaft splined portion, and a corrosion-resistant sleeve extending in the area between said inner race and said shaft and in inter-fitting relationship with said inner hub.

2. The coupling between a shaft and a drive coupling element as set forth in claim 1, wherein the coupling element has a hub portion with a cylindrical opening therein in which the inner hub is affixed, the inner hub being formed from a high-strength material.

3. The coupling between a shaft and a drive coupling element as set forth in claim 2, wherein the inner hub is affixed by welding to the coupling element.

4. The coupling between a shaft and a drive coupling element as set forth in claim 1, wherein the inner hub has a bore at one end thereof that telescopically receives an end of the sleeve to provide the inner-fitting relationship.

5. The coupling between a shaft and a drive coupling element as set forth in claim 4, wherein the coupling element has a hub portion with a cylindrical opening therein in which the inner hub is affixed, the inner hub being formed from a high-strength material.

6. The coupling between a shaft and a drive coupling element as set forth in claim 5, wherein the inner hub is affixed by welding to the coupling element.

7. The coupling between a shaft and a drive coupling element as set forth in claim 1, further including a pair of seals disposed on opposite sides of the inner race and having a sealing relationship with the corrosion-resistant sleeve.

8. The coupling between a shaft and a drive coupling element as set forth in claim 7, wherein the inner hub has a bore at one end thereof that telescopically receives an end of the sleeve to provide the inner-fitting relationship.

9. The coupling between a shaft and a drive coupling element as set forth in claim 8, wherein the coupling element has a hub portion with a cylindrical opening therein in which the inner hub is affixed, the inner hub being formed from a high-strength material.

10. The coupling between a shaft and a drive coupling element as set forth in claim 9, wherein the inner hub is affixed by welding to the coupling element.

* * * * *